(12) United States Patent
Shim et al.

(10) Patent No.: US 12,519,550 B2
(45) Date of Patent: Jan. 6, 2026

(54) SHIP IOT WIRELESS COMMUNICATION SYSTEM USING METAL SURFACE WAVE

(71) Applicants: KOREA INSTITUTE OF OCEAN SCIENCE & TECHNOLOGY, Busan (KR); Sunnywavetech, Ulsan (KR)

(72) Inventors: Woo Seong Shim, Daejeon (KR); Bu Young Kim, Daejeon (KR); Hak Sun Kim, Seoul (KR); Jin Woo Kong, Incheon (KR)

(73) Assignees: Korea institute of Ocean Science & Technology, Busan (KR); Sunnywavetech, Ulsan (KR); UNIST (Ulsan National Institute of Science and Technology), Ulsan (KR)

( * ) Notice: Subject to any disclaimer, the term of this patent is extended or adjusted under 35 U.S.C. 154(b) by 809 days.

(21) Appl. No.: 17/824,250

(22) Filed: May 25, 2022

(65) Prior Publication Data

US 2023/0171004 A1    Jun. 1, 2023

(30) Foreign Application Priority Data

Nov. 26, 2021    (KR) .......................... 10-2021-0165897

(51) Int. Cl.
*H04B 13/00* (2006.01)
*G16Y 10/30* (2020.01)
*H04L 67/12* (2022.01)

(52) U.S. Cl.
CPC ............. *H04B 13/00* (2013.01); *H04L 67/12* (2013.01); *G16Y 10/30* (2020.01)

(58) Field of Classification Search
CPC .......... H04B 13/00; H04L 67/12; G16Y 10/30
See application file for complete search history.

(56) References Cited

U.S. PATENT DOCUMENTS

| 10,396,853 B1* | 8/2019 | Olsson | H04B 3/54 |
| 2014/0106665 A1* | 4/2014 | Ong | H01Q 1/007 |
| | | | 455/14 |

(Continued)

FOREIGN PATENT DOCUMENTS

| KR | 10-2017-0033943 A | 3/2017 |
| KR | 10-2018-0083214 A | 7/2018 |
| KR | 10-2293048 B1 | 8/2021 |

OTHER PUBLICATIONS

Kong et al., "Experimental Study of Wireless Communication System by Surface wave Communication through Confined Spaces on Vessels" published by inventors of the present application, Journal of Korean Navigation and Port Research, vol. 45, No. 6, p. 366-371, Nov. 19, 2021.

*Primary Examiner* — Michael A Keller
*Assistant Examiner* — Thao D Duong
(74) *Attorney, Agent, or Firm* — Knobbe, Martens, Olson & Bear, LLP

(57) ABSTRACT

A ship IoT wireless communication system using metal surface waves is proposed. The ship IoT wireless communication system may include a first access point installed in a first compartment among a plurality of compartments formed in a ship, and a second access point installed in a second compartment among the plurality of compartments. Each of the first access point and the second access point may perform surface wave communication with each other to form a communication network inside the ship. Each of the first and second access points may include a surface wave generator configured to transmit and receive a surface wave through at least one of a floor, a ceiling, or a bulkhead of each of the plurality of compartments.

5 Claims, 4 Drawing Sheets

(56) References Cited

U.S. PATENT DOCUMENTS

| | | | |
|---|---|---|---|
| 2018/0205415 A1* | 7/2018 | Bien | H04B 14/00 |
| 2019/0207857 A1* | 7/2019 | Shelton, IV | H04L 47/24 |
| 2020/0176879 A1* | 6/2020 | Wolniansky | H01P 3/16 |
| 2020/0177234 A1* | 6/2020 | Barzegar | H04B 7/15 |
| 2020/0195302 A1* | 6/2020 | Vannucci | H01B 11/1895 |

* cited by examiner

SHIP IOT WIRELESS COMMUNICATION SYSTEM USING METAL SURFACE WAVE

CROSS REFERENCE TO RELATED APPLICATION

The present application claims priority to Korean Patent Application No. 10-2021-0165897, filed Nov. 26, 2021, the entire contents of which are incorporated herein for all purposes by this reference.

BACKGROUND

Technical Field

The present disclosure relates to a ship (Internet of Things) IoT wireless communication system using metal surface waves.

Description of Related Technology

The shipbuilding industry is a national key industry, and in order to maintain business competitiveness thereof, it is very important to improve the efficiency of shipbuilding, such as building a ship in a short time at a small cost. In a ship under construction, the assembly sequence of each part is determined according to a ship's building stage, and the progress and accident status of one part are required to be shared in real time with other parts. Accordingly, communication is essentially required in a ship under construction.

SUMMARY

One aspect is a ship IoT wireless communication system using metal surface waves which enables communication between compartments in a ship regardless of the thickness of a bulkhead.

In one embodiment, the ship IoT wireless communication system includes: a first access point installed in a first compartment among a plurality of compartments formed in a ship, and a second access point installed in a second compartment among the plurality of compartments, wherein each of the first access point and the second access point performs surface wave communication with each other to form a communication network inside the ship, and comprises a surface wave generator for transmitting and receiving a surface wave through a floor, a ceiling, and a bulkhead of each of the plurality of compartments.

Each of the first access point and the second access point may transmit and receive the surface wave through an opening part formed in at least one of the floor, ceiling, and bulkhead of each of the plurality of compartments.

The opening part may allow a metal surface of the first compartment and a metal surface of the second compartment to be seamlessly connected to each other.

The opening part may be formed in a shape of a slit having height of 0.4 mm or more.

For the installation positions of the first access point and the second access point, the structure of each of the compartments with which communication is intended to be performed, and the installation environment of a metal body thereof may be considered. The installation position of one access point in an associated compartment of the compartments may be determined as a position closest to an opening part connected to a remaining compartment of the compartments with which the associated compartment is intended to preferentially communicate according to a preset priority of the remaining compartment with which the communication is intended to be performed.

The surface wave generator may include: a transmission part which transmits a surface electromagnetic wave through a metal surface, and a reception part which receives a surface electromagnetic wave transmitted through the metal surface.

The ship IoT wireless communication system using metal surface waves according to the embodiment of the present disclosure enables communication between compartments in a ship regardless of the thickness of a bulkhead.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

When the design of a part of a ship under construction is changed, the changed design is required to be received promptly even at a site in which the part with the changed design is being worked on, and the order of ship construction may be required to be changed by reflecting the changed design in other parts. Alternatively, the design and construction of the other parts may be required to be changed.

However, since the inside of a ship is divided into a plurality of spaces through thick bulkheads, radio waves are very severely blocked between the spaces, and thus it is difficult to apply an existing radio communication technology using radio waves in a poor environment for radio communication. Additionally, it is difficult to install a wired communication facility during a ship building work due to problems such as manufacturing cost, manufacturing time, and continuous change of an internal environment according to the ship building work.

In order to solve this problem, a communication system using ultrasonic waves has been proposed, but due to the characteristics of ultrasonic waves, the ultrasonic waves cannot penetrate a ship bulkhead having a thickness of 57 mm or more, so the communication system using ultrasonic waves cannot be applied thereto when the thickness of a bulkhead is 57 mm or more A singular expression used in this specification includes a plural expression unless a context clearly dictates otherwise. In this specification, terms such as "composed of" or "include" should not be construed as necessarily including all of the various components or various steps described in the specification, and may not include some components or steps thereof, or may include additional components or steps. In addition, terms such as ". . . part" and ". . . module" described in the specification mean a unit that processes at least one function or operation, which may be implemented as hardware or software, or as a combination of hardware and software.

Herebelow, various embodiments of the present disclosure will be described in detail with reference to the accompanying drawings.

Figure 1:
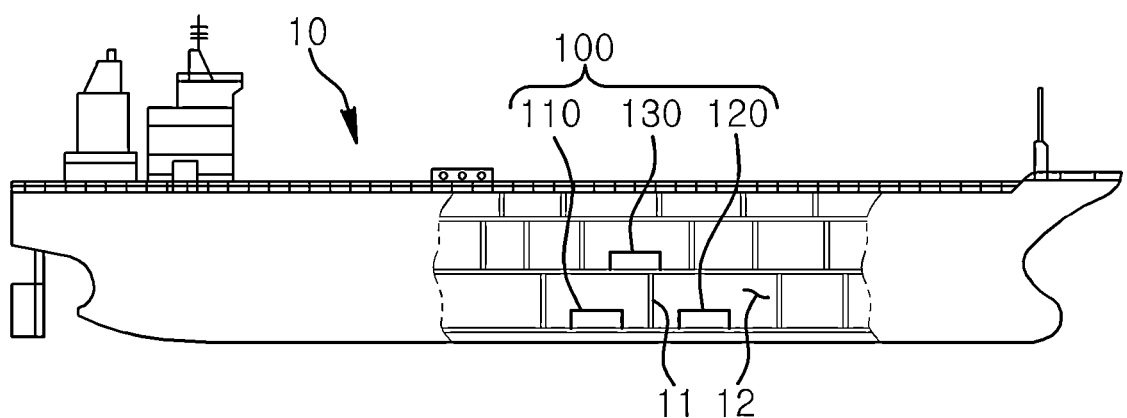
FIG. 1 is a view illustrating the configuration of a ship to which a ship IoT wireless communication system using metal surface waves is applied according to the embodiment of the present disclosure.

FIG. 1 is a view illustrating the configuration of a ship to which a ship IoT wireless communication system using metal surface waves is applied according to an embodiment of the present disclosure.

Referring to FIG. 1, the ship IoT wireless communication system 100 using metal surface waves according to the embodiment of the present disclosure is installed in each of a plurality of compartments 12 formed in the ship 10 to be applied to the ship 10.

Generally, as illustrated in FIG. 1, the ship 10 has the plurality of compartments 12 separated from each other by a plurality of bulkheads 11, and each of a plurality of access points 110, 120, and 130 constituting the ship IoT wireless communication system 100 is located in each of the compartments 12, with each of the bulkheads 11 put between the access points. For example, each of the access points 110, 120, and 130 is located in the compartment 12 and may be installed on the floor, ceiling, or bulkhead 11 of the compartment 12 according to the installation position of the access point.

In FIG. 1, three access points 110, 120, and 130 installed in three compartments 12, respectively, are illustrated, and this is just an example. The access points 110, 120, and 130 may be installed in all compartments 12, respectively, so as to realize efficient communication in the ship 10.

As illustrated in FIG. 1, the ship IoT wireless communication system 100 using metal surface waves according to the embodiment of the present disclosure may include a first access point 110 installed on the floor of a first compartment 15, a second access point 120 installed on the floor of a second compartment 16, and a third access point 130 installed on the floor of a third compartment. Here, each of the floor and ceiling of each compartment 12 is different only in position from the bulkhead 11, and may have the same function and structure as the function and structure of the bulkhead 11.

Hereinafter, such a ship IoT wireless communication system 100 using metal surface waves according to the embodiment of the present disclosure will be described in detail with reference to FIGS. 2 to 4.

Figure 2:
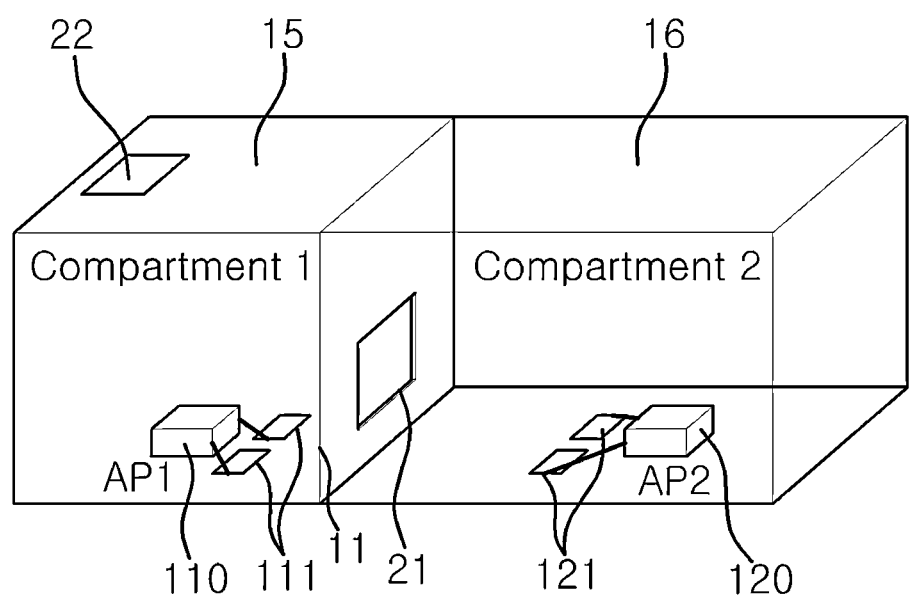
FIG. 2 is a view roughly illustrating the configuration of the ship IoT wireless communication system using metal surface waves according to the embodiment of the present disclosure.
Figure 3:
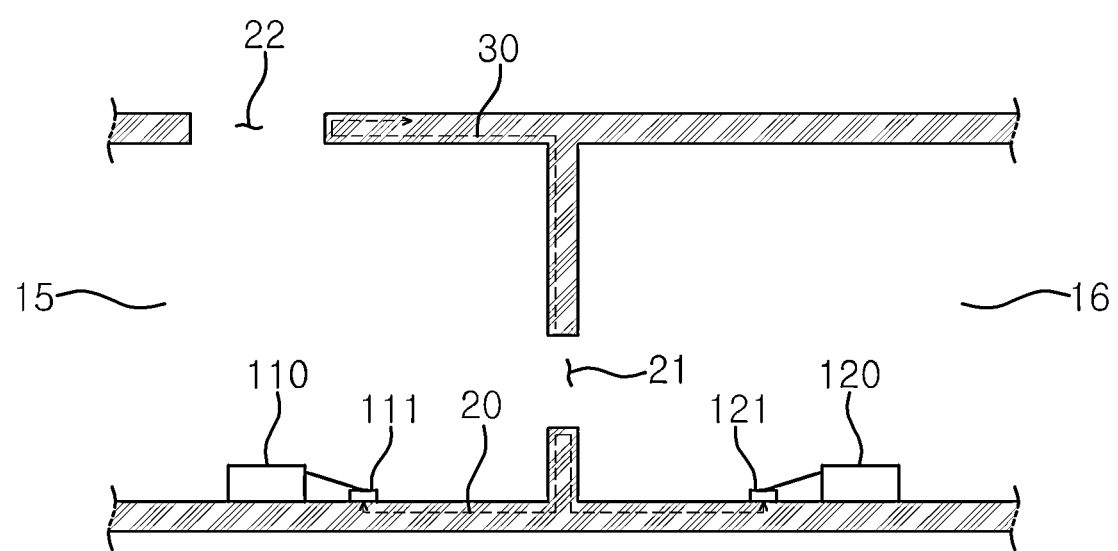
FIG. 3 is a view roughly illustrating the section of the configuration of the ship IoT wireless communication system using metal surface waves in FIG. 2 according to the embodiment of the present disclosure.

FIG. 2 is a view roughly illustrating the configuration of the ship IoT wireless communication system using metal surface waves according to the embodiment of the present disclosure, and FIG. 3 is a view roughly illustrating the section of the configuration of the ship IoT wireless communication system using metal surface waves in FIG. 2 according to the embodiment of the present disclosure.

Referring to FIGS. 2 and 3, the ship IoT wireless communication system 100 using metal surface waves according to the embodiment of the present disclosure may include the first access point 110 installed in the first compartment 15, and the second access point 120 installed in the second compartment 16.

Here, the access point 110 or 120 is a device which performs surface wave communication with another access point to form a communication network inside the ship, and may be connected to various terminals installed in the compartment 15 or 16. For example, the terminals may include a smartphone, a laptop computer, a walkie-talkie, a server, an IoT sensor, and the like.

In addition, as illustrated in FIGS. 2 and 3, each access point 110 or 120 may be installed on the floor of each compartment 15 or 16, and may include a surface wave generator 111 or 121 for transmitting and receiving a surface wave through the floor, ceiling, and bulkhead 11 of the compartment 15 or 16. Here, in order to transmit and receive a surface wave through the floor, the ceiling, and the bulkhead 11 which are made of metal materials, the surface wave generator 111 or 121 may also be installed to be in close contact with the floor of each compartment 15 or 16.

For example, the surface wave generator 111 or 121 may have a structure capable of generating a surface electromagnetic wave for transmitting data generated by the access point 110 or 120. That is, the surface wave generator 111 or 121 may include a transmission part (or a transmitter) and a reception part (or a receiver). Accordingly, the transmission part of a first surface wave generator 111 may transmit a surface electromagnetic wave through a metal surface, and the reception part of a second surface wave generator 121 may receive a surface electromagnetic wave transmitted through a metal surface.

Particularly, according to the embodiment of the present disclosure, a surface wave transmitted by the access point 110 or 120 of each compartment 15 or 16 may be efficiently transmitted and received through an opening part 21 or 22 formed in at least one of the floor, ceiling, and bulkhead 11 of each compartment 15 or 16. Here, the opening part 21 or 22 may be pre-formed according to design or need while the ship 10 is built.

That is, as illustrated in FIGS. 2 and 3, a first opening part 21 may be formed in the bulkhead 11 of the first compartment 15, and a second opening part 22 may be formed in the ceiling of the first compartment 15. Accordingly, the first opening part 21 enables a surface wave transmission/reception between the first access point 110 of the first compartment 15 and the second access point 120 of the second compartment 16 to be efficiently performed. Additionally, the second opening part 22 enables a surface wave transmission/reception between the third access point (not shown) of the third compartment (not shown) neighboring to the ceiling of the first compartment 15 and the first access point 110 of the first compartment 15 to be efficiently performed.

More specifically, as illustrated in FIG. 3, due to the opening parts 21 and 22 formed respectively in the bulkhead 11 and the ceiling of the first compartment 15, metal surfaces of the first compartment 15 and the second compartment 16 may be seamlessly connected to each other, and metal surfaces of the first compartment 15 and the third compartment may be seamlessly connected to each other.

Accordingly, referring to FIG. 3, a surface wave transmitted and received by the first surface wave generator 111 and the second surface wave generator 121, respectively, may be transmitted from the first compartment 15 to the second compartment 16 along a first surface wave movement path 20. Additionally, a surface wave transmitted by the first surface wave generator 111 may be transmitted from the first compartment 15 to the third compartment along a second surface wave movement path 30.

Accordingly, the first surface wave movement path 20 and the second surface wave movement path 30 may be formed since the metal surfaces of the first compartment 15 and the second compartment 16, and the metal surfaces of the first compartment 15 and the third compartment are connected to each other through the opening parts 21 and 22, respectively.

Meanwhile, in the compartment 15 or 16, the installation position of the access point 110 or 120 may be determined according to a preset priority of the compartment 15 or 16 with which communication is intended to be performed. That is, in the compartment 15 or 16, the access point 110 or 120 may be installed at a position close to the compartment 15 or 16 with which communication is intended to preferentially be performed.

For example, in FIGS. 2 and 3, in a case in which a compartment with which the first compartment 15 intends to preferentially communicate is the second compartment 16, in the first compartment 15, the first access point 110 may be installed at a position close to the first opening part 21 by half or less a distance between the first opening part 21 and the second opening part 22. This allows a surface wave to first arrive at the first opening part 21 connected to the second compartment 16 to which the first compartment 15 intends to preferentially transmit the surface wave, thereby reducing the effect of radio wave interference due to multiple paths.

Figure 4:
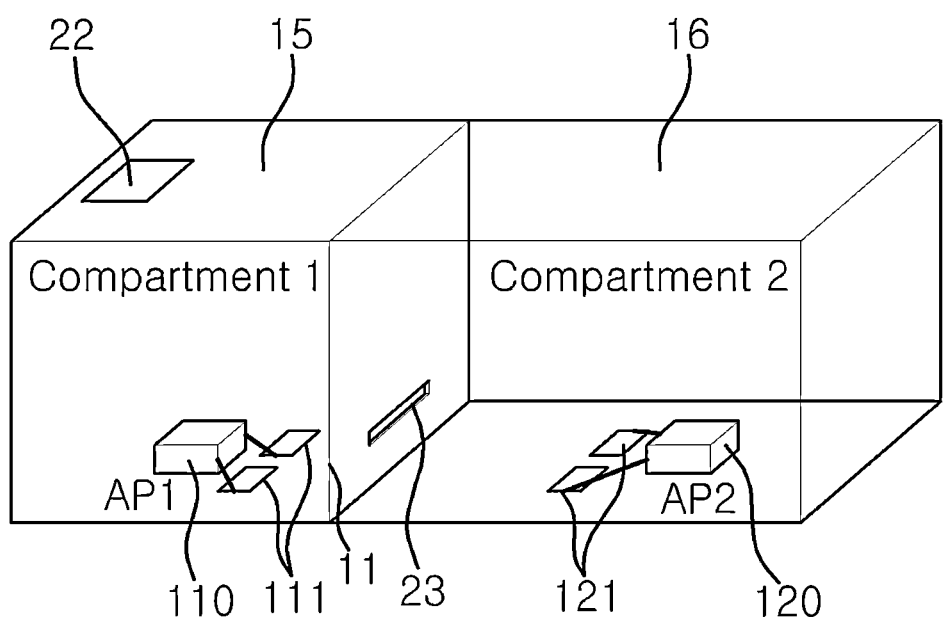
FIG. 4 is a view roughly illustrating the configuration of a ship IoT wireless communication system using metal surface waves according to another embodiment of the present disclosure which is applicable even when it is difficult to form an opening part according to a condition for realizing the watertightness of a bulkhead.

FIG. 4 is a view roughly illustrating the configuration of a ship IoT wireless communication system using metal surface waves according to another embodiment of the present disclosure which is applicable even when it is difficult to form an opening part according to a condition for realizing the watertightness of the bulkhead.

Referring to FIG. 4, the ship IoT wireless communication system 100 using metal surface waves according to the another embodiment of the present disclosure may include the first access point 110 installed in the first compartment 15, and the second access point 120 installed in the second compartment 16.

In addition, a third opening part 23 may be formed in the bulkhead 11 of the first compartment 15, and the second opening part 22 may be formed in the ceiling of the first compartment 15. Here, the third opening part 23 may be formed in the form of a slit.

The configuration of the ship IoT wireless communication system using metal surface waves according to the another embodiment of the present disclosure illustrated in FIG. 4 is the same as the configuration of the ship IoT wireless communication system 100 using metal surface waves according to the embodiment of the present disclosure described in FIGS. 2 and 3, but is different therefrom in that instead of the first opening part 21, the slit-shaped third opening part 23 is formed in the bulkhead 11. Accordingly, hereinafter, for understanding of the present disclosure and the convenience of description thereof, the same description made above through FIGS. 2 and 3 will be omitted.

That is, FIG. 4 illustrates that an opening part is artificially formed in the bulkhead 11 when there is no pre-formed opening part according to design during building of the ship 10 or the need of watertightness realization during operation thereof.

When without an opening part formed in the bulkhead 11, a sealed environment in which a connected metal surface path between the first compartment 15 and the second compartment 16 is not formed is created, an opening part is inevitably required to be artificially formed to connect metal surfaces of the first compartment 15 and the second compartment 16 to each other.

Accordingly, to the extent that the essential structural and functional purposes of the bulkhead 11 are not impaired, the slit-shaped third opening part 23 may be formed in the bulkhead 11.

The slit-shaped third opening part 23 is preferably formed to be as small as possible to maintain a function in terms of the structural strength of the bulkhead made of metal, but is required to be formed to have height of at least 0.4 mm. Furthermore, the third opening part 23 may be sealed with a non-conductive insulator, such as a rubber packing, to maintain a watertight structure.

The above-described embodiments of the present disclosure are disclosed for the purpose of illustration, and those skilled in the art with ordinary knowledge about the present disclosure are able to make various modifications, changes, and additions within the spirit and scope of the present disclosure, and such modifications, changes and additions should be considered to fall within the scope of the following claims.

What is claimed is:

1. A ship Internet of Things (IoT) wireless communication system using metal surface waves, the system comprising:
 a first access point installed in a first compartment among a plurality of compartments formed in a ship; and
 a second access point installed in a second compartment among the plurality of compartments,
 wherein each of the first access point and the second access point is configured to perform surface wave communication with each other to form a communication network inside the ship,
 wherein the first compartment and the second compartment comprise a shared bulkhead shared by the first compartment and the second compartment,
 wherein the shared bulkhead comprises an opening part passing therethrough,
 wherein each of the first access point and the second access point comprises a surface wave generator configured to transmit and receive a surface wave, and
 wherein the opening part is configured to enable the surface wave generator of the first access point and the surface wave generator of the second access point to communicate the surface wave between the first compartment and the second compartment at least through the shared bulkhead and the opening part.

2. The system of claim 1, wherein the opening part is configured to allow a metal surface of the first compartment and a metal surface of the second compartment to be seamlessly connected to each other via a metal surface of the opening part.

3. The system of claim 1, wherein the opening part has a shape of a slit having height of 0.4 mm or more.

4. The system of claim 1, further comprising a third access point in a third compartment, wherein the first compartment and the third compartment comprise a shared wall that is a ceiling or floor of the first compartment and a floor or ceiling of the third compartment, the shared wall comprising a secondary opening part passing through the shared wall, and wherein the first access point of the first compartment is disposed to be closer to the opening part than to the secondary opening part.

5. The system of claim 1, wherein the surface wave generator comprises:
 a transmitter configured to transmit a surface electromagnetic wave through a metal surface; and a receiver configured to receive a surface electromagnetic
wave transmitted through the metal surface.

* * * * *